United States Patent [19]
Marsh et al.

[11] Patent Number: 5,440,819
[45] Date of Patent: Aug. 15, 1995

[54] ACTUATOR AND PROGRAMMABLE AMPLIFIER FOR AN EXPANDING PLUG GAGE HEAD

[75] Inventors: David W. Marsh, North Scituate, R.I.; Jiening Lai, Nashua, N.H.; Wilfred R. Auger, Woonsocket, R.I.

[73] Assignee: Comtorgage Corporation, Slatersville, R.I.

[21] Appl. No.: 229,813

[22] Filed: Apr. 19, 1994

[51] Int. Cl.⁶ .............................................. G01B 3/26
[52] U.S. Cl. .................... 33/501.6; 33/542.1; 33/542; 33/501.08
[58] Field of Search ............. 33/501.05, 501.08, 501.5, 33/501.6, 501.09, 542, 544, 544.2, 544.3, 542.1, 545, 504, 505

[56] References Cited

U.S. PATENT DOCUMENTS

| | | | |
|---|---|---|---|
| 3,343,270 | 9/1967 | Eisele | 33/542.1 |
| 3,940,856 | 3/1976 | Meyer, Jr. | 33/501.05 |
| 4,112,355 | 9/1978 | Gibson, Jr. et al. | 33/501.6 |
| 4,181,958 | 1/1980 | Juengel et al. | 33/505 |
| 4,419,829 | 12/1983 | Miller | 33/501.6 |
| 4,604,809 | 8/1986 | Meyer, Jr. | 33/542 |
| 4,885,845 | 12/1989 | Yamamoto et al. | 33/544.5 |
| 5,063,687 | 11/1991 | Olshefsky | 33/542 |
| 5,095,638 | 3/1992 | David et al. | 33/504 |
| 5,189,808 | 3/1993 | Evans et al. | 33/542 |

FOREIGN PATENT DOCUMENTS

| | | | |
|---|---|---|---|
| 1932674 | 2/1970 | Germany | 33/542 |
| 0001064 | 4/1982 | WIPO | 33/556 |

Primary Examiner—Thomas B. Will
Attorney, Agent, or Firm—Salter & Michaelson

[57] ABSTRACT

An actuator and programmable amplifier is operative for use with an expanding plug gage head operated by an axially movable plunger having a tapered operating end and an opposite cross head end. The cross head end of the plunger is releasably received and secured through a slot in a retracting lever which is pivotably mounted in the actuator/amplifier housing. A compression spring normally urges the plunger to a fully extended position within the gage head. The retracting lever is actuatable for withdrawing the plunger from the gage head. The actuator/amplifier device includes a transducer having a core which is coupled to the crosshead end of the plunger. The transducer is operative for measuring an axial position of the plunger within the gage head. The programmable amplifier includes a memory for storing a plurality of sets of configuration data for a plurality of different gage heads. Each of the sets of configuration data includes a predetermined measuring dimension of the gage head, and a predetermined amplification factor of the tapered operating end of the plunger of the gage head. The amplifier further includes a key pad for inputting configuration data to the memory and for selecting one of the sets of configuration data from the memory. A central processor is programmed to convert the sensed axial position of the plunger to a measured dimension according to the selected set of configuration data. The measured dimension is output to a digital liquid crystal display.

14 Claims, 6 Drawing Sheets

ACTUATOR AND PROGRAMMABLE AMPLIFIER FOR AN EXPANDING PLUG GAGE HEAD

BACKGROUND AND SUMMARY OF THE INVENTION

The instant invention relates to expanding plug gage heads, and more particularly to an actuator and programmable amplifier for actuating an expanding plug gage head and amplifying a dimension sensed by the gage. The sensed dimension is displayed on a digital liquid crystal display.

Expanding plug gage heads and amplifiers therefore have heretofore been known in the art. In this regard, a variety of different expanding plug gage heads are available for measuring both inner diameter and outer diameter dimensions. An expanding plug gage head includes a split and expandable gage body formed with an enlarged workpiece engaging end and an integral hinge. A plunger having a tapered conical end is received through the gage body so that the tapered end engages with an internal socket adjacent the workpiece engaging end of the gage body. Axial movement of the plunger within the gage body causes the cone tipped end to engage with the internal socket thereby expanding or contracting the workpiece engaging end. The opposite end of the plunger is formed with a T-shaped bayonet for coupling to an actuator/amplifier device. The prior art actuator/amplifier devices are purely mechanical in nature and they include a spring-loaded slotted lever to which the bayonet end of the plunger is connected for retracting the plunger and contracting the gage head. The prior art actuator/amplifiers further include a series of levers and gears which respond to the axial displacement of the plunger and magnify the motion. The measured dimension is displayed on a circular indicator dial on the actuator/amplifier unit. The indicator dial has a mid-point representing a standard measurement wherein movement of the indicator hand to the left or right of the mid-point indicates a +/− deviation from the standard measurement. Gage heads and amplifier devices are typically offered in a choice of many different amplification factors in both English and Metric measurements. For example, Comtorgage Corporation of Slatersville, R.I. manufactures a series of gage heads and amplifiers having an amplification system comprising at least eight different amplification factors, i.e. CM1, CM2, CM3, CM4, CM6, CM8, CM10 and CM14. The different amplification factors are accomplished by varying the angle on the tapered conical end of the plunger. The internal gears and levers of the amplifiers do not change, but the different amplifications are reflected on the indicator dial of the amplifier which has a graduated deviation scale corresponding to the angle of the plunger. Accordingly, an expansion plug having a particular amplification factor must be matched to an amplifier having the corresponding scale on the indicator dial. While the mechanical amplifiers are extremely accurate in producing true measurements, there are two significant drawbacks. Firstly, the user must maintain a set of amplifiers for each amplification system because the gage heads are offered in different amplification scales. Furthermore, in the mass production of machined parts, it is often necessary to keep detailed records of deviation from standard measurements in order to improve or alter machining processes to produce more accurate parts. Since it is not possible to connect the mechanical amplifiers to any kind of electronic monitoring system, the measurements must be recorded by hand. Hand recording is extremely time consuming and is prone to human error.

In this regard, a coupler which is adapted to connect an expanding plug gage head with an electronic display device and data collector is disclosed in the U.S. Pat. No. to Meyers 4,604,809 which represents the closest prior art to the subject invention of which the applicant is aware. The coupler comprises a series of levers that convert the linear displacement of the plunger to a 1:1 ratio where contact is made with an electronic transducer. The transducer electrically relays the position of the plunger to an electronic indicator device. The electronic indicator system allows repeated measurements to be recorded in a data collector for later analysis. The coupler and electronic indicator therefore eliminates the problem of recording measurements. However, since the transfer levers in the coupler are designed to convert the axial displacement of a particular angle on the cone tip of a plunger and each different amplification system has its own unique angle, a different coupler device is required for each amplification system. As is the case with the mechanical amplifiers, the expansion plug must be matched with a particular coupler to produce a true measurement. Since gage heads are typically produced in eight different magnification systems, an operator of the electronic recording system must keep on hand eight different coupler devices.

The instant invention provides an actuator and programmable amplifier which is operative for use with a plurality of different gage heads having a plurality of different amplification factors, and which provides a means for inputting and storing different gage head configurations. The actuator/amplifier of the instant invention includes a housing having a retracting lever pivotably mounted therein. The cross head end of the plunger of the gage head is releasably received and secured through a slot in the retracting lever. A compression spring normally urges the retraction lever and plunger to a first position wherein the plunger is fully extended within the gage head. The retracting lever is pivotally actuatable for withdrawing the plunger so that the tapered working end of the plunger is at least partially retracted from the gage head. The actuator/amplifier device further includes a transducer having a core which is coupled to the crosshead end of the plunger. The transducer is operative for measuring an axial position of the plunger within the gage head. The programmable actuator/amplifier still further includes a memory for storing a set of configuration data for each of a plurality of different gage heads. Each set of configuration data includes a predetermined measuring dimension of the gage head, a predetermined amplification factor of the tapered operating end of the plunger of the gage head and several other data elements. The actuator/amplifier further includes a key pad for inputting the configuration data to the memory and for selecting one of the sets of configuration data from the memory. A central processor converts the sensed axial position of the plunger to a measured dimension according to the selected set of configuration data and outputs the measured dimension to a digital liquid crystal display.

Accordingly, it is an object of the instant invention to provide an actuator for an expanding plug gage head which is operable with a plurality different gage heads having different amplification factors.

It is another object to provide a programmable amplifier for an expanding plug gage head which is operable for amplifying the motion of gage heads having a plurality of different amplification factors.

It is another object to provide a programmable amplifier for expanding plug gage heads which provides means for inputting and storing a plurality of different gage head configurations.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
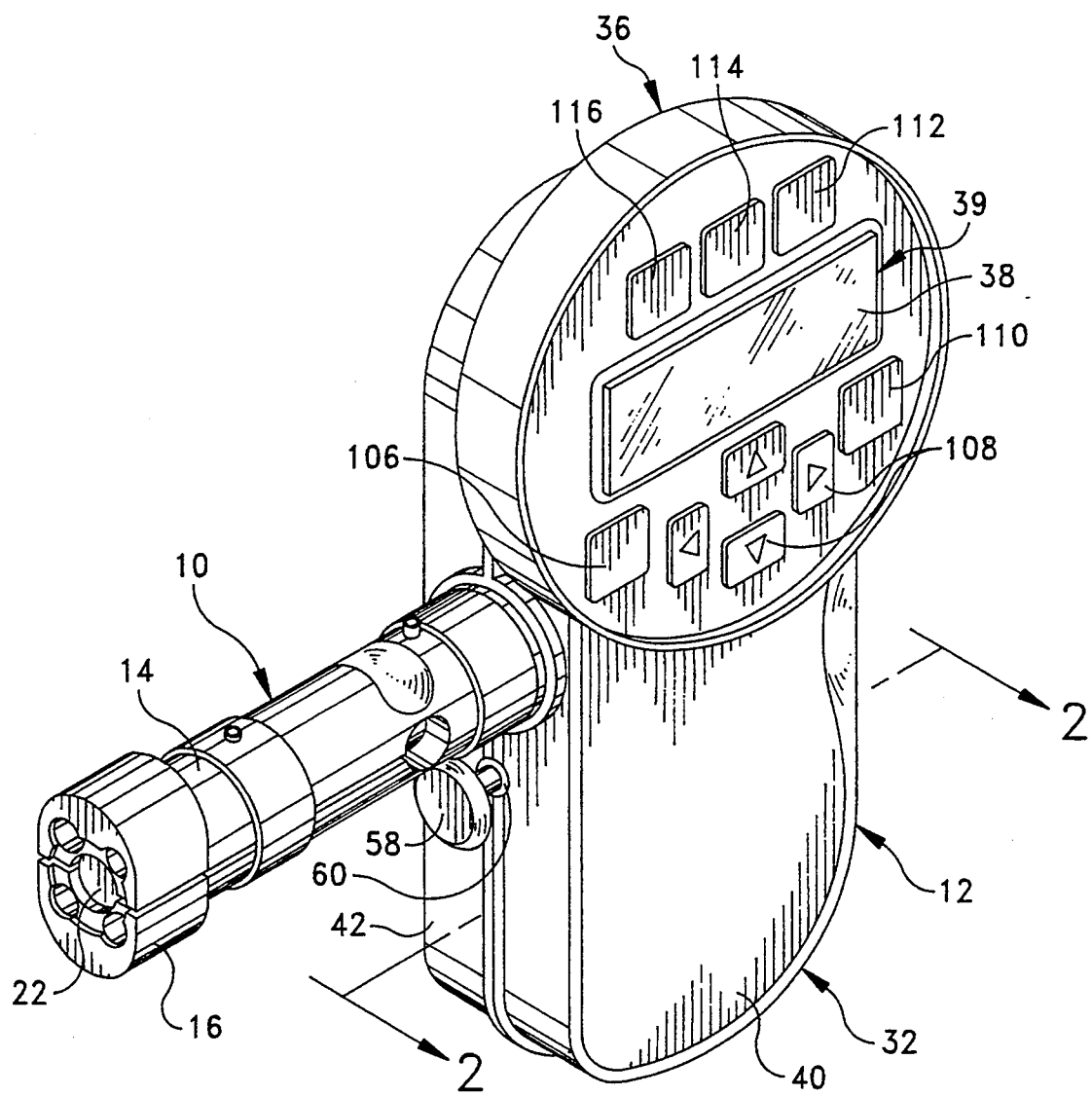
FIG. 1 is a perspective view of the actuator and programmable amplifier of the instant invention with an expanding plug gage head assembled therewith.
Figure 2:
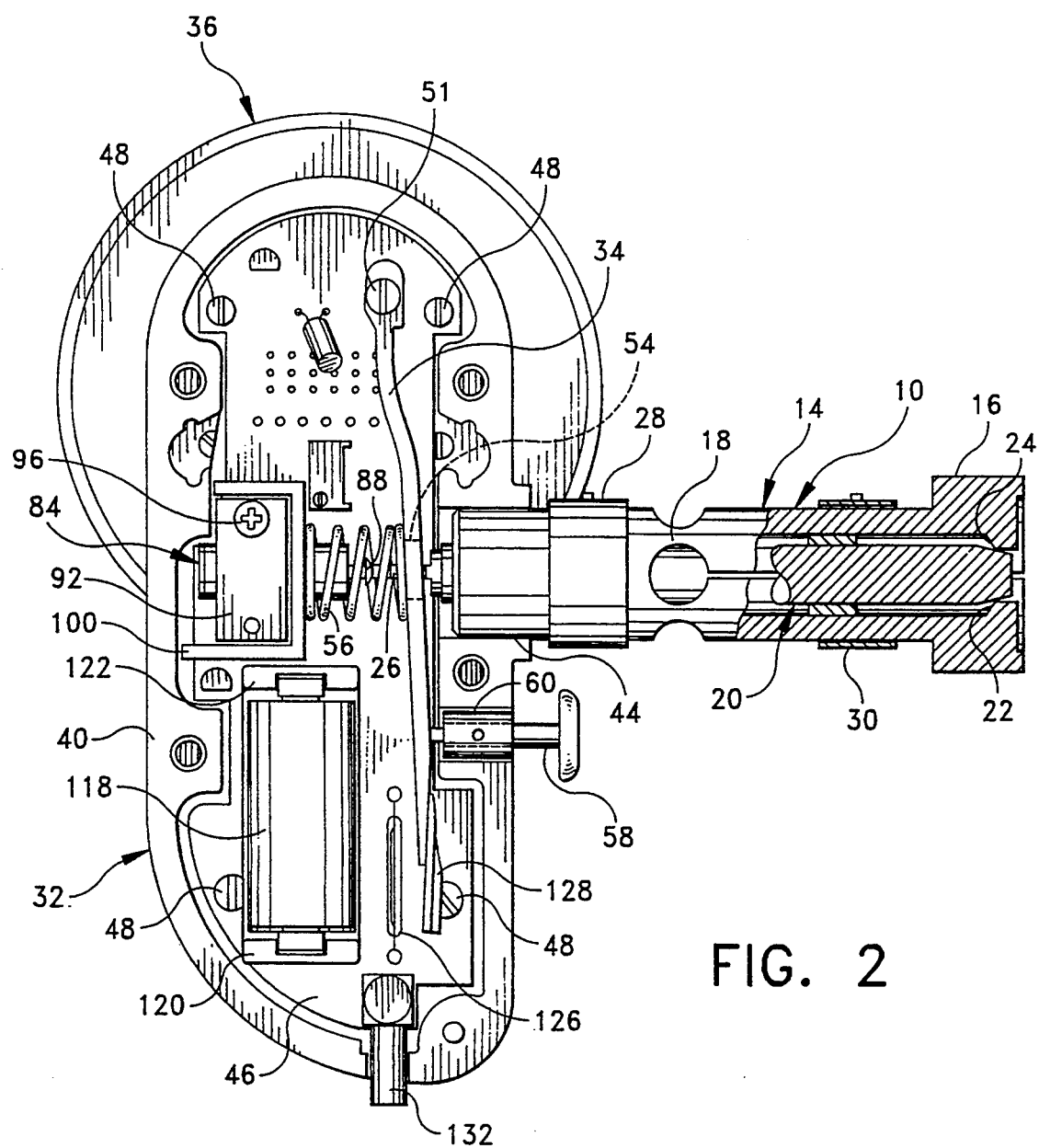
FIG. 2 is a cross-sectional view thereof taken along line 2—2 of FIG. 1.

Referring now to drawing FIGS. 1 and 2, an expanding plug gage head generally indicated at 10 is illustrated in assembled relation with an actuator and programmable amplifier (actuator/amplifier) generally indicated at 12. As will hereinafter be more fully described, the instant actuator/amplifier 12 is operable for use with a plurality of different expanding plug gage heads 10 each having a different measuring dimension and amplification factor. The actuator/amplifier 12 is further operative for storing a plurality of sets of configuration data for different gage heads 10.

The gage head 10 includes a split and expandable gage body 14 formed with an enlarged workpiece engaging end 16 and an integral hinge 18. A plunger generally indicated at 20 having a tapered conical end 22 is received axially through the gage body 14 so that the tapered end 22 engages with an internal socket 24 adjacent the workpiece engaging end 16 of the gage body 14. The tapered end 22 of the plunger 20 is tapered at a predetermined angle which provides a corresponding amplification factor. Axial movement of the plunger 20 within the gage body 14 causes the cone tipped end 22 to engage with the internal socket 24 thereby expanding or contracting the workpiece engaging end 16. The opposite end of the plunger 20 is formed with a T-shaped bayonet 26 for connection with the actuator/amplifier 12. The gage head 10 further includes a positioning bushing 28 for establishing the location of the gage head 10 with respect to actuator/amplifier 12 and a collar 30 for limiting expansion of the workpiece engaging end 16.

The actuator/amplifier 12 comprises a housing generally indicated at 32 having a retracting lever 34 pivotably mounted therein, and further comprises a display head generally indicated at 36 having a digital liquid crystal display 38 and key pad 39 mounted therein. The housing 32 includes front and rear housing section halves 40 and 42 respectively, which are received and secured together in interfitting engagement. The front and rear housing sections 40 and 42 cooperate to form an opening 44 for receiving the expanding plug gage head 10. A circuit board assembly 46 is secured in the front housing section 40 with threaded screws 48 and spacer elements 49 wherein the circuit board 46 provides support for various internal components to be described hereinafter. The circuit board assembly 46 includes a two sets of pin connectors 50a and 50b for connection with the display head 36. The retracting lever 34 is pivotably secured by a screw 51 on a post 52 which extends upwardly through the circuit board 46. The cross head end 26 of the plunger 20 is received through a slot 54 in the retracting lever 34 and twist engaged with the retracting lever 34 in a conventional manner. A compression spring 56 positioned behind the retraction lever 34 normally urges the retraction lever 34 and plunger 20 to a first position (FIG. 2) wherein the plunger 20 is fully extended within the gage head 10 and the gage head 10 is expanded. The retracting lever 34 is pivotably actuatable for withdrawing the plunger 20 to a second position (not shown) wherein the tapered working end 22 of the plunger 20 is at least partially retracted from the gage head 10 and the gage head 10 is contracted. The retraction lever 34 is actuated by a push button 58 which is slidably mounted in a bushing 60.

Figure 3:
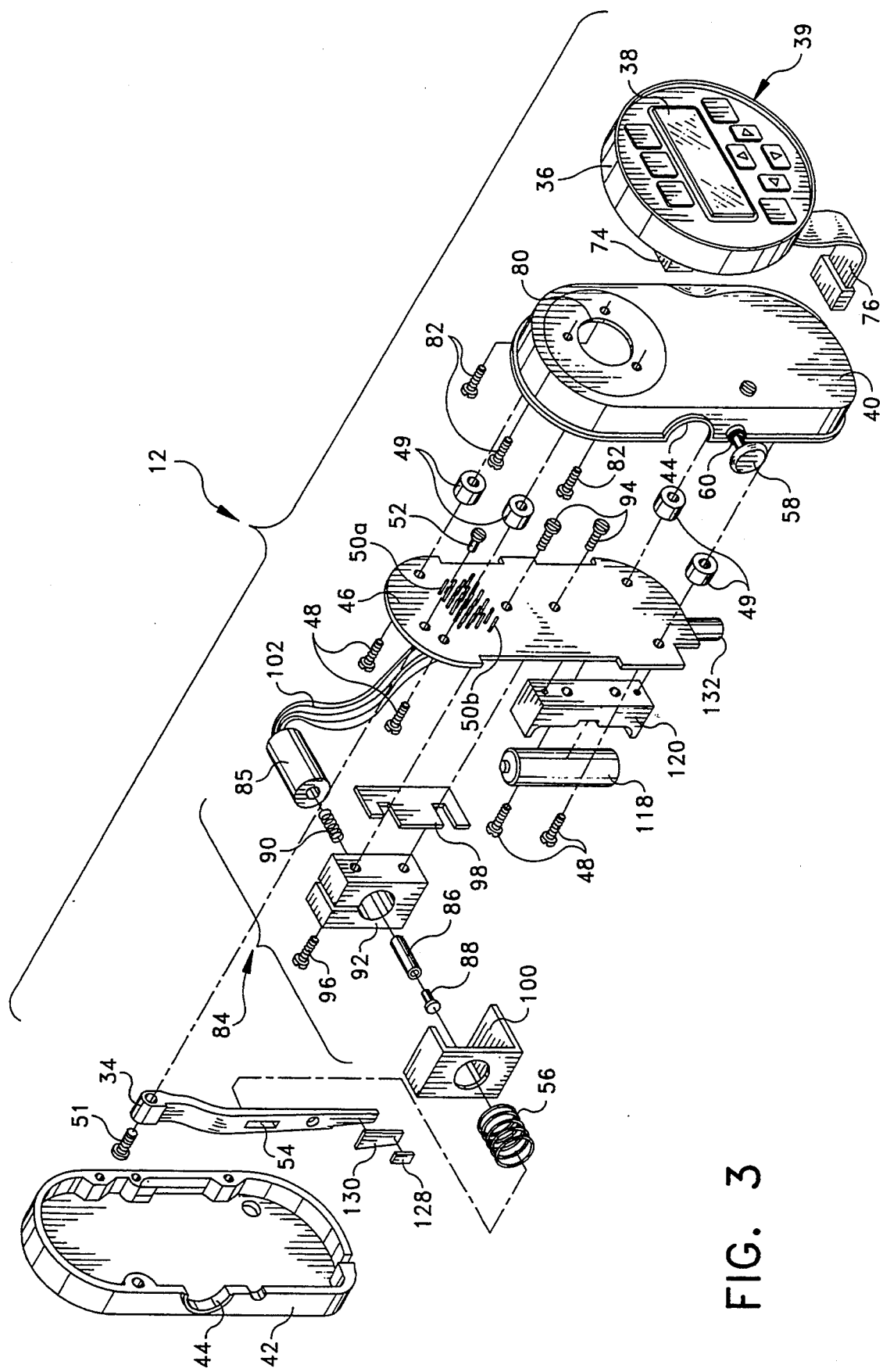
FIG. 3 is another perspective view, partially exploded for purposes of illustration.
Figure 4:
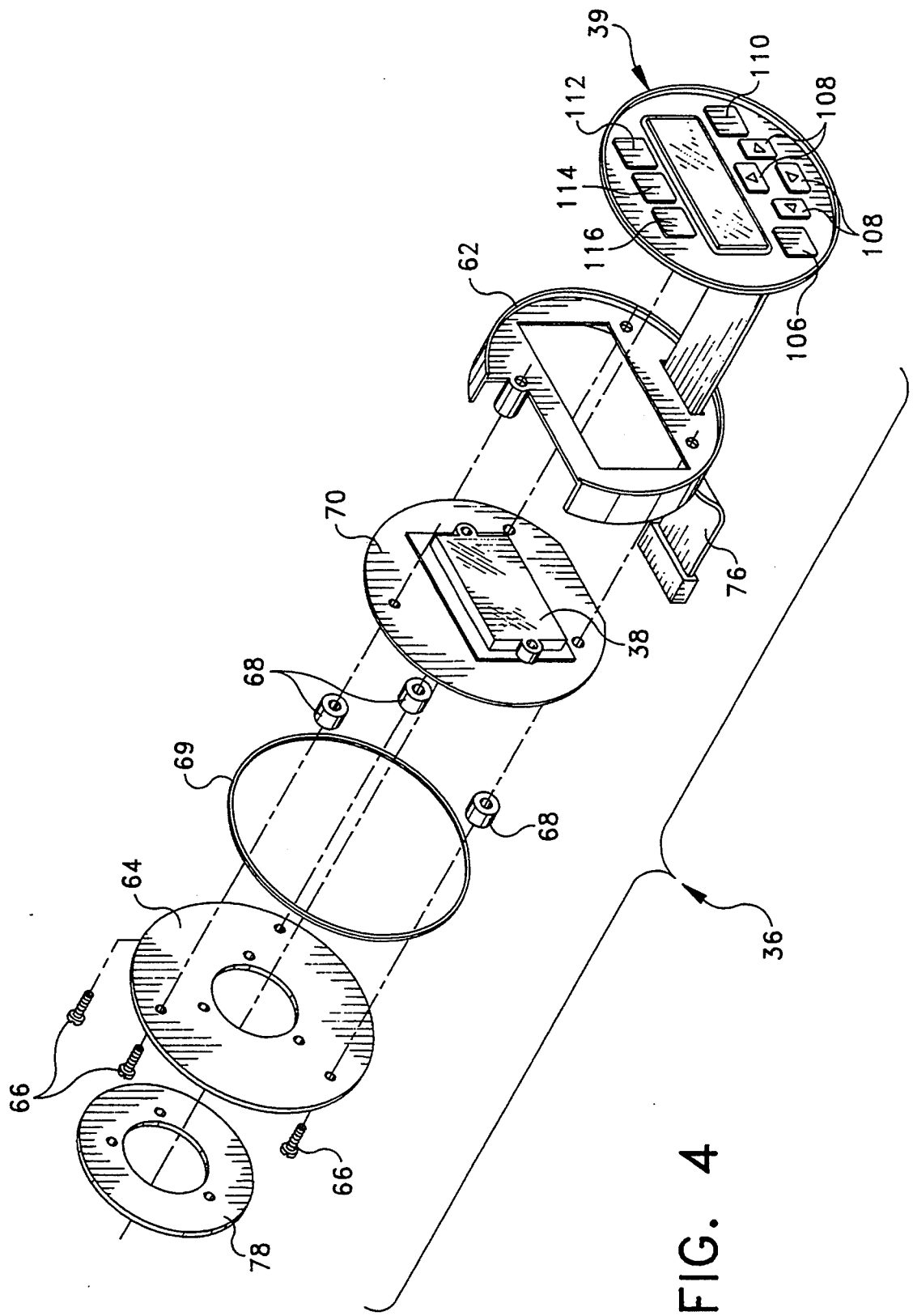
FIG. 4 is an exploded perspective view of the display head.
Figure 5:
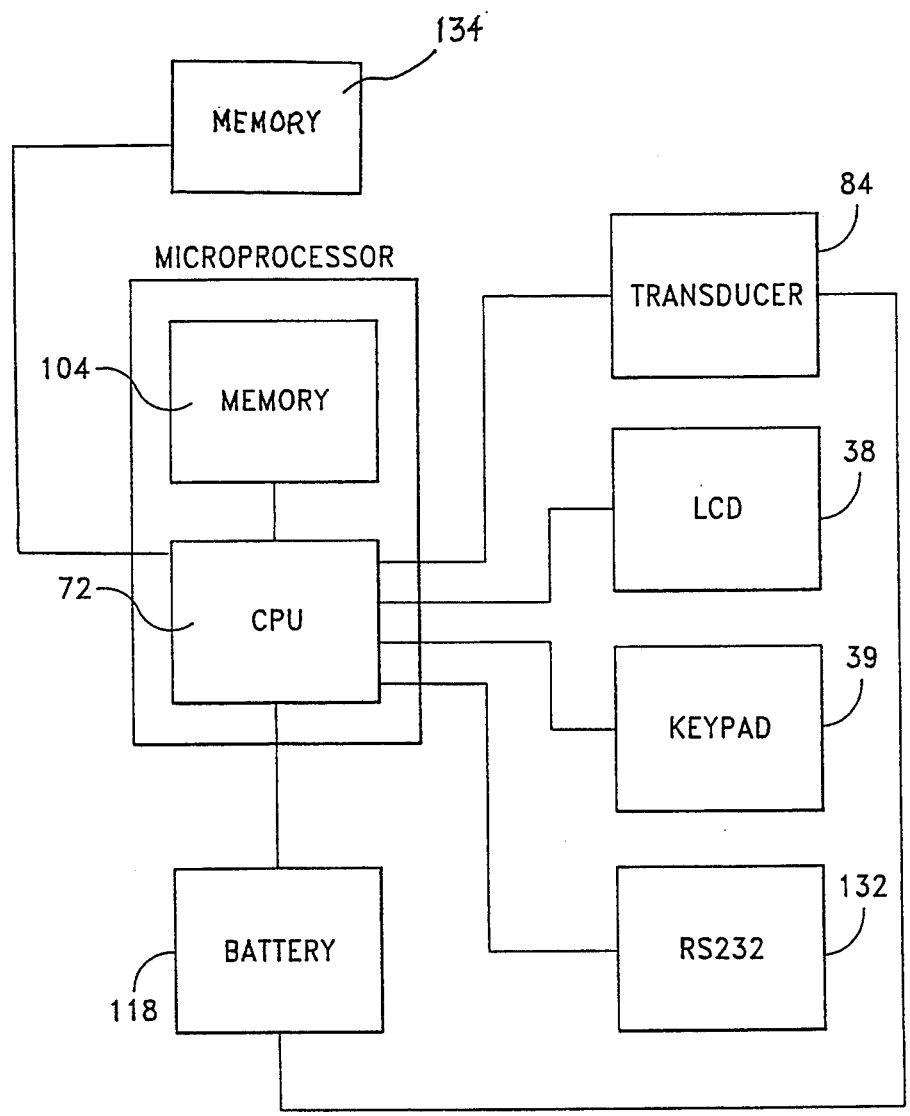
FIG. 5 is a block diagram of the electronic components of the programmable amplifier.

The display head 36 (FIG. 4) comprises a bezel 62 and a rear plate 64 which are secured together with screws 66 and spacer elements 68. Sandwiched between the bezel 62 and rear plate 64 is a spacer ring 69, and a circuit board 70 which includes the digital liquid crystal display 38 and further includes the central processor chip 72 (FIG. 5) which converts the axial movement of the plunger 20 into a measured dimension for display on the liquid crystal display 38. The rear surface of the circuit board 70 includes a male receptacle 74 (FIG. 3) for connection with the circuit board 46 mounted in the housing 32. The key pad 39 preferably comprises a membrane type key pad which is conventional in the electronic arts. It is pointed out that a membrane type key pad is beneficial in that grease, oil and dirt which are normally found in a shop work place cannot penetrate the membrane and possible short circuit the sensitive electronics. The key pad 39 is arranged in a circular configuration for assembly with the bezel 62 of the display head 36. Arrangement and function of the individual keys will be described hereinafter. The key pad 39 includes a flat cable 76 for connection with the circuit board 46 in the housing 32. The display head 36 is assembled with the front housing section 40 with a rubber gasket 78 (FIG. 4) received therebetween. The male receptacle 74 and cable 76 extend rearwardly from the display head 36 and are received through aperture 80 in the front housing section 40 for attachment to pin groupings 50a and 50b respectively. Screws 82 extend through the housing 40 and the rear plate 64 to secure the display head 36 in position.

The actuator/amplifier 12 further includes a transducer device generally indicated at 84. Preferably the transducer comprises a miniature LVDT having a body 85, a core 86 and contact pin 88 which are mounted coaxially with the plunger 20 of the gage head 10. The transducer core 86 is biased outwardly by a spring 90 and is coupled to the crosshead end 26 of the plunger 10 via the contact pin 88 for measuring an axial position of the plunger 20 within the gage head 10. The transducer core 86 preferably has a maximum travel of 0.100 inches for a full range of electronic gage measurement as the plunger 20 is moved axially in the gage body 14. The transducer 84 is secured in a split bushing 92 which is in turn secured to the circuit board assembly 46 by screws 94. A screw 96 is received in the split portion of the bushing 92 for securing the transducer 84 in place. An insulating gasket 98 is received between the bushing 92 and the circuit board 46 to prevent short circuits. A spring isolating bracket 100 is received over the front of the bushing 92 for providing a seat for the compression spring 56 which is captured between the bracket 100 and retraction lever 34. The output of the transducer 84 is connected by cables 102 to the circuit board 46 which is in turn connected to the central processor 72.

The central processor 72 is coupled to a memory 104 for storing a plurality of sets of configuration data for a plurality of different gage heads 10. In this connection, the key pad 39 is operative for inputting configuration data to the memory 104 and for selecting one of the sets of configuration data from the memory 104. The central processor 72 is programmed with instructions for converting the sensed axial position of the plunger 20 to a measured dimension according to the selected set of configuration data. The memory 104 and central processor 72 are preferably combined in a microprocessor chip for a compact design. The electronic hardware comprising the central processor 72 and memory 104 are well known in the electronic arts and therefore no further description is thought to be necessary. The central processor 72 is programmed according to well known programming techniques to achieve the desired conversion of the transducer core position to a measured dimension according to a selected set of configuration data. The central processor 72 is further programmed with a preferred menu system for easily entering and selecting particular gage head data for use. Each set of configuration data includes a predetermined measuring dimension of the gage head 10, a predetermined amplification factor of the tapered operating end 22 of the plunger 20 of the gage head 10, as well as other specific data related to the particular gage head to be utilized. In this regard, it is pointed out that each gage head is manufactured for measuring a specific dimension, i.e. 0.7500 inch or 1.000 inch, and that each gage head 10 has a plunger 20 with a predetermined amplification factor. Accordingly, before any gage head 10 can be used with the actuator/amplifier 12, the measuring dimension and amplification factor must be input to the memory 104. The converted dimension calculated by the central processor 72 is output to the digital liquid crystal display 38 for the user to read.

The key pad 39 comprises a plurality of membrane-type toggle switches including the following: a MODE/EXIT switch 106; UP, DOWN, LEFT and RIGHT toggle switches 108; an ENTER switch 110; a SET switch 112; a DEVIATION/ABSOLUTE measurement switch 114; and INCH/MM conversion switch 116.

By using the key pad 39 the user can easily enter a desired gage head configuration or can select a desired configuration which is stored in the memory. In this connection, a preferred menu format for entering, editing, and selecting gage head configurations will be described hereinafter.

PREFERRED MENU FORMAT

1. Press MODE/EXIT 106 until MODE appears on display.
2. Press ENTER 110. A selection of MEASURE; SELECT GAGE; or LOC will be offered. MEASURE will normally be displayed first.
3. Toggle UP or DOWN switches 108 to scroll through MEASURE; SELECT GAGE; or LOC. Press ENTER 110 for the selection desired.
4. When MEASURE or SELECT GAGE is entered, the measurement size of the last gauge head used will be displayed, i.e. 1.0000 inch.
5. If MEASURE is selected, and the gage head to be used is the same as the displayed gage head, insert gage head into a reference ring and press SET 112 to set a reference position of the transducer core. Proceed with measuring in normal fashion.
6. If SELECT GAGE is entered, a particular gage head size previously stored in memory will be displayed.
7. If the displayed gage head is the gage head desired, press ENTER 110. CHOOSE will be displayed. Press ENTER 110 again. Press SET 112. Proceed with measuring.
8. If the gage head is not the desired gage head, toggle through the possible selections using the UP and DOWN switches 108. (A total of 5 gage head configurations can be stored in memory.) If not all of the 5 gage head configurations are stored in memory, the prompt NEW will appear for the empty memory locations wherein the user can enter a new configuration in accordance with the instructions in menu item 11 below.
9. When the gage head desired appears, press ENTER 110. A choice of CHOOSE or EDIT is now offered. CHOOSE will be displayed.
10. If CHOOSE is entered the gage head selected will be displayed. Press SET 112. Proceed with measuring.
11. If the gage head displayed is not desired, and there are no new memory locations available, toggle to EDIT and press ENTER 110. A security code option will now be displayed (SCD ). The security code feature can be activated or deactivated if not desired. If the security code option is selected and no security code has previously been entered, the user will be prompted to select a security code. Enter a security code and press ENTER. If a security code was previously entered the user will be prompted to input the proper security code. If an improper code is entered FAIL will appear and reconfiguration will not be allowed. If the security code is correct, the gage head dimension previously used will be displayed.

Toggle UP or DOWN 108 until the desired gage head configuration to be edited is displayed and press ENTER 110. Configuration of a new gage head then takes place by editing the existing configuration data.

12. Toggle through the displayed amplification factors CM1, CM2, CM3, CM4, CM6 CM8, CM10, and CM14 until the desired amplification factor is displayed. Press ENTER 110.
13. Toggle for INCH/MM and press ENTER 110.
14. Edit the gage head size using the UP and DOWN switches 109. The number to be edited will blink continuously. Toggle the LEFT and RIGHT switches to change the position of the blinking number. Press ENTER 110 when finished.

15. Toggle for INNER DIAMETER or OUTER DIAMETER and press ENTER 110. (The actuator/amplifier is operative for use with both inner and outer diameter measuring heads.)

16. Toggle for use of a tolerance indicator, both plus and minus.

17. Enter tolerance limits for both plus and minus. (If the measured dimension is greater than the tolerance limit, the digit LCD readout will blink to alert the user.)

18. Final gage head size will appear on display.

19. Insert gage head into a reference ring and Press SET 112. Proceed with measuring according to new configuration.

Measurements can be changed from inches to mm at anytime by toggling the IN/MM switch 116.

Measurements can be read in deviation from a standard measurement or absolute by pressing the DEV/ABS switch 114.

If LOC is selected in step 3, a measurement taken when the display is not visible will be locked in and displayed after the gage head 10 is retracted from the bore.

Figure 6:
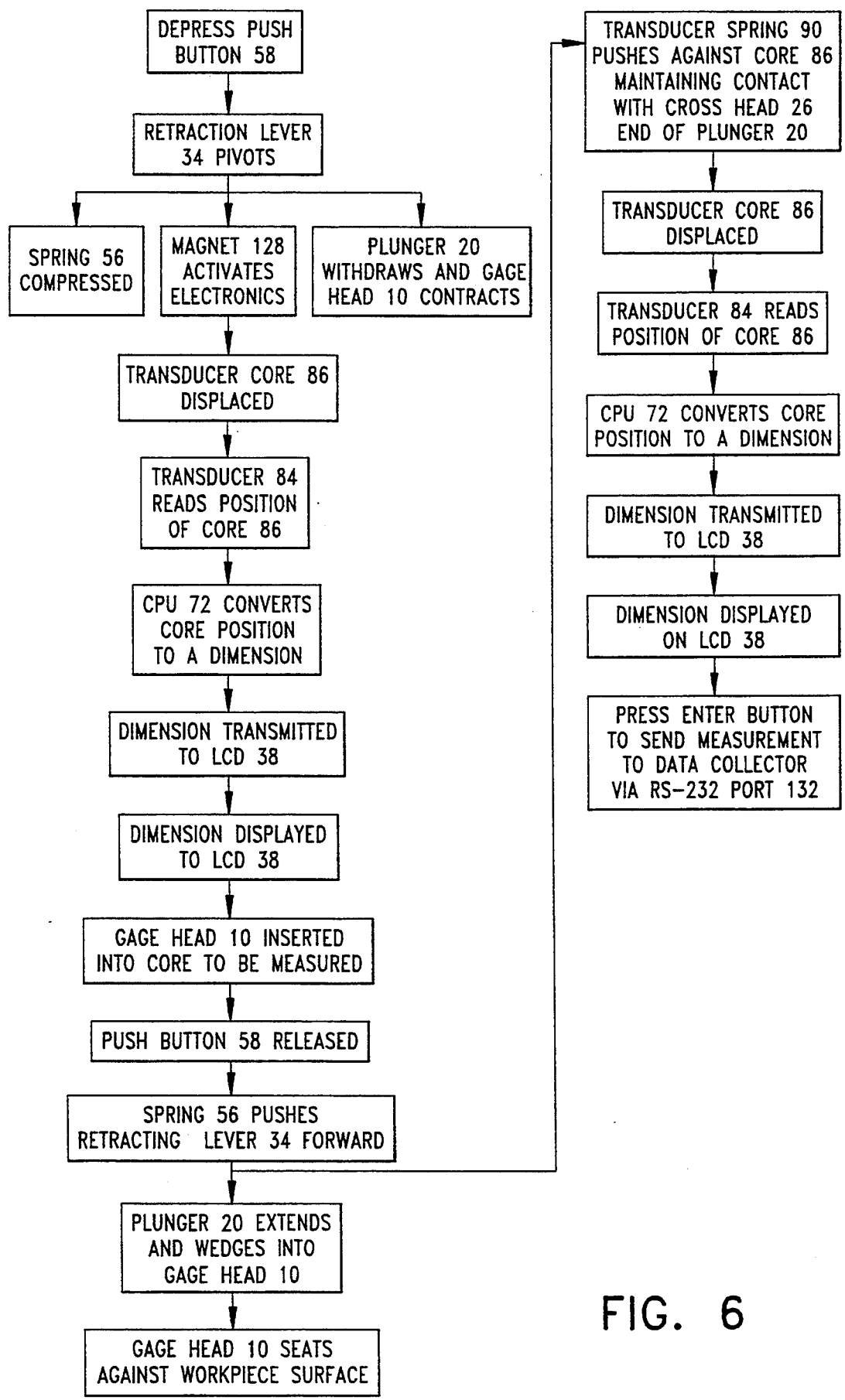
FIG. 6 is a flow chart of the mechanical operation of the device.

After the proper configuration data are entered into the memory 104, the actuator/amplifier is ready for use. A detailed flow chart of mechanical operation is depicted in FIG. 6.

Figure 7:
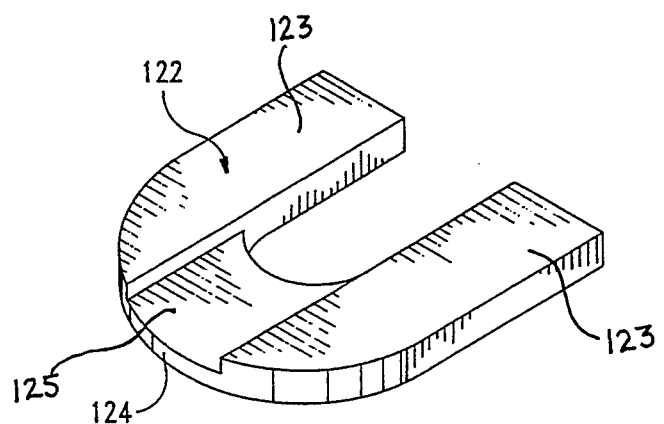
FIG. 7 is a perspective view of a battery holder insert.

An internal battery 118 is provided for energizing the transducer 84, central processor 72, and LCD 38. The battery 118 is received into a conventional battery holder 120 which is secured to the circuit board assembly 46. In order to prevent insertion of the battery 118 in the wrong direction, i.e. with the polarities reversed, the battery holder 118 is provided with a unique guide insert 122 (FIG. 7) at the positive lead. The insert 122 comprises a generally U-shaped body having two spaced leg portions 123 and a bridge portion 124 connecting said leg portions. The bridge portion 124 has a recessed slot 125 formed in one surface thereof for permitting the positive pole of the battery 118 to contact the positive lead. However, if the battery 118 is inserted in the wrong direction, the negative pole of the battery 118 is prevented from making contact with the positive lead thereby preventing a reversed polarity flow of electricity through the electronics.

The actuator/amplifier 12 is still further provided with a switch 126 for selectively energizing the electrical components. The switch 126 preferably comprises a magnetic switch wherein the end of the retracting lever 34 is provided with a magnet 128 for closing the switch 126 and energizing the electrical components. More specifically, the magnet 128 is attached to a brass bar 130 which is in turn attached to the retracting lever 34. The brass bar 130 isolates the magnet from the retraction lever. When the retraction lever 34 is actuated, the magnet 128 swings over the switch 126 (FIG. 2) to energize the electronics. The central processor 72 is preferably programmed to de-energize the electrical components after a predetermined period of time if the retraction lever 34 is not re-actuated.

Still further, the actuator/amplifier 12 is provided with an integral RS-232 port 132 for outputting measurement information to an external data collector (not shown). The RS-232 port is connected via a serial port so that the RS-232 can be directly coupled to a personal computer.

In an alternative embodiment, the actuator/amplifier 12 can be provided with an additional memory 134 (FIG. 5) wherein repeated data measurements are directly stored in the internal memory 134 instead of being output to an external data collector. In this manner the measurement data can be stored internally and then downloaded to a computer at the end of a series of measurements.

It can therefore be seen that the instant invention provides a unique actuator and programmable amplifier which is operative for use with a plurality of gage heads each having different amplification factors. The actuator/amplifier includes a transducer for sensing the axial position of the gage head plunger and the electronic signal from the transducer is provided to a central processor which is operative for converting the transducer signal into a measurement dimension. The amplifier is provided with a memory for storing a plurality of different gage head configurations for ease of use. Once a gage head configuration is entered into the memory, the central processor is operative for converting the axial position of the transducer core into a measured dimension according to the selected configuration data. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

We claim:

1. An actuator and programmable amplifier for use with one of a plurality of different expanding plug gage heads, each operated by an axially movable plunger having a tapered operating end and an opposite cross head end, comprising:

a housing;

means for releasably mounting a select one of said plurality of gage heads in said housing;

a retracting lever pivotably mounted in the housing, said cross head end of said plunger being releasably received and secured through a slot in said retracting lever;

spring means for normally urging said retracting lever to a first position wherein said plunger is fully extended into said gage head;

means for actuating said retracting lever for withdrawing said plunger to a second position wherein said plunger is at least partially retracted from said gage head;

a transducer having a core which extends coaxially with said plunger, said core being in engagement with the crosshead end of said plunger for sensing an axial position of said plunger;

memory means for storing a plurality of sets of configuration data for said plurality of different gage heads, each of said sets of configuration data including a predetermined measuring dimension of said gage head, and a predetermined amplification factor of said tapered operating end of said plunger of said gage head;

input means for inputting said plurality of sets of configuration data to said memory means and for selecting one of said sets of configuration data from said memory means which corresponds to said selected gage head;

central processing means coupled to said transducer for converting said sensed axial position of said plunger to a measured dimension according to said selected set of configuration data;

display means for displaying said measured dimension; and electrical power means for energizing said central processing means.

2. The actuator and programmable amplifier of claim 1 further comprising switch means for selectively energizing said central processing means.

3. The actuator and programmable amplifier of claim 1 further including means for automatically deenergizing said central processing means after a predetermined period of time.

4. In the actuator and programmable amplifier of claim 2, said switch means being coupled to said retraction lever for energizing said central processing means when said retraction lever is actuated.

5. The actuator and programmable amplifier of claim 1 further comprising means for selectively outputting said measurements to a data collecting device.

6. In the actuator and programmable amplifier of claim 5, said means for outputting comprising an RS-232 port.

7. In the actuator and programmable amplifier of claim 1, said input means comprising a membrane type key pad.

8. An actuator and programmable amplifier for use with one of a plurality of different expanding plug gage heads, each operated by an axially movable plunger having a tapered operating end and an opposite cross head end, comprising:

a housing;

means for releasably mounting a select one of said plurality of gage heads in said housing;

spring means for normally urging said plunger to a first position wherein said plunger is fully extended into said gage head;

means for selectively retracting said plunger to a second position wherein said plunger is at least partially retracted from said gage head;

a transducer having a core which extends coaxially with said plunger, said core being axially coupled to the crosshead end of said plunger for sensing an axial position of said plunger;

memory means for storing a plurality of sets of configuration data for said plurality of different gage heads, each of said sets of configuration data including a predetermined measuring dimension of said gage head, and a predetermined amplification factor of said tapered operating end of said plunger of said gage head;

input means for inputting said plurality of sets of configuration data to said memory means and for selecting one of said sets of configuration data from said memory means which corresponds to said selected gage head;

central processing means coupled to said transducer for converting said sensed axial position of said plunger to a measured dimension according to a selected set of configuration data;

display means for displaying said measured dimension; and electrical power means for energizing said central processing means.

9. In the actuator and programmable amplifier of claim 8, said display means comprising a liquid crystal display.

10. The actuator and programmable amplifier of claim 8 further comprising switch means for selectively energizing said central processing means.

11. The actuator and programmable amplifier of claim 8 further comprising means for selectively outputting said measurements to a data collecting device.

12. An actuator and programmable amplifier for use with an expanding plug gage head operated by an axially movable plunger having a tapered operating end and an opposite cross head end, comprising:

a housing;

means for releasably mounting said gage head in said housing;

spring means for normally urging said plunger to a first position wherein said plunger is fully extended into said gage head;

means for selectively retracting said plunger to a second position wherein said plunger is at least partially retracted from said gage head;

electronic sensing means coupled to the crosshead end of said plunger for sensing an axial position of said plunger;

memory means for storing configuration data for said gage head, said configuration data including a predetermined measuring dimension of said gage head, and a predetermined amplification factor of said tapered operating end of said plunger of said gage head;

input means for inputting said configuration data to said memory means;

central processing means coupled to said electronic sensing means for converting said sensed axial position of said plunger to a measured dimension according to said configuration data; and display means for displaying said measured dimension.

13. In the actuator and programmable amplifier of claims 12, said electronic sensing means comprising a transducer having a core which extends coaxially with said plunger, said core being axially coupled to the crosshead end of said plunger for sensing an axial position of said plunger.

14. In the actuator and programmable amplifier of claim 12, said input means comprising a membrane type key pad.

* * * * *